Figure 1:
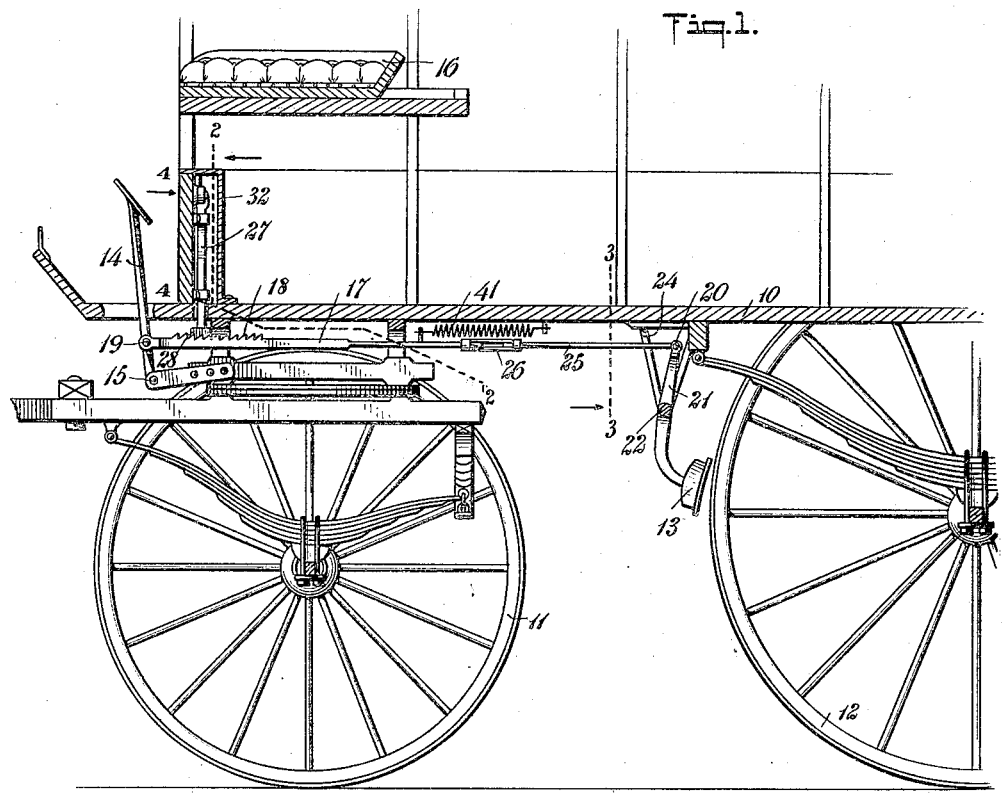

A. H. MARHENKE.
VEHICLE BRAKE LOCK.
APPLICATION FILED NOV. 19, 1913.

1,124,232. Patented Jan. 5, 1915.

WITNESSES

INVENTOR
August H. Marhenke
BY
ATTORNEYS

THE NORRIS PETERS CO., PHOTO-LITHO., WASHINGTON, D. C.

UNITED STATES PATENT OFFICE.

AUGUST HEINRICH MARHENKE, OF NEW YORK, N. Y.

VEHICLE BRAKE-LOCK.

1,124,232.    Specification of Letters Patent.    Patented Jan. 5, 1915.

Application filed November 19, 1913. Serial No. 801,841.

*To all whom it may concern:*

Be it known that I, AUGUST H. MARHENKE, a citizen of the United States, and a resident of the city of New York, borough of the Bronx, in the county of the Bronx and State of New York, have invented a new and Improved Vehicle Brake-Lock, of which the following is a full, clear, and exact description.

This invention relates to carriages and wagons, and has particular reference to means for controlling the running of such vehicles.

Among the objects of the invention is to provide a brake acting upon the wheels or other running parts of the vehicle with provision for locking the brake by positive means under the control of the driver and other authorized persons.

More specifically stated, an object of the invention is to prevent the frequent loss by theft of delivery wagons or other vehicles left standing temporarily on city streets, means being provided to lock the vehicle brake by means requiring the use of a key adapted for the individual lock and carried by the owner or driver of the vehicle.

The foregoing and other objects of the invention will hereinafter be more fully described and claimed and illustrated in the drawings forming a part of this specification in which like characters of reference indicate corresponding parts in all the views, and in which—

Figure 2:
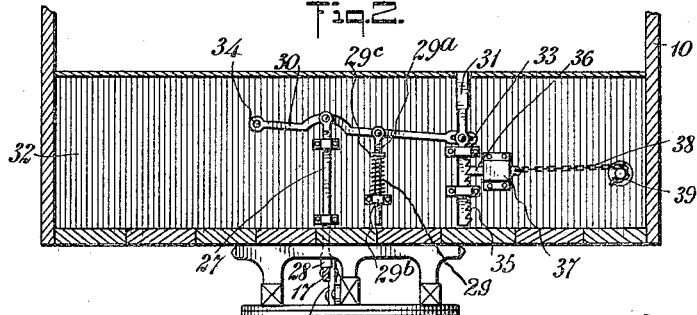
Figure 3:
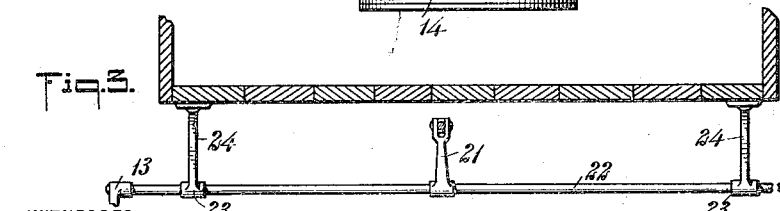
Figure 4:
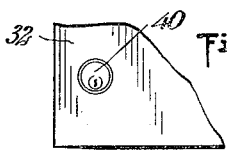

Figure 1 is a vertical longitudinal section of sufficient of the vehicle to illustrate the broad principle of the invention; Fig. 2 is a vertical transverse section on the line 2—2 of Fig. 1; Fig. 3 is a similar view on the line 3—3; and Fig. 4 is a detail in front elevation showing the outside view of the lock as seen on the line 4—4 of Fig. 1.

The several parts of the device may be made of any suitable materials, and the relative sizes and proportions, as well as the general design of the mechanism, may be varied to a considerable extent without departing from the spirit of the invention hereinafter more fully set forth and specifically claimed.

At 10 I show a portion of a vehicle body understood to be supported in any usual or approved manner upon front wheels 11 and rear wheels 12, and at 13 I show one of a pair of brake shoes adapted to coöperate with the rear wheels, but such illustration of brake mechanism is to be understood as typical of any suitable brake coöperating with any part of a vehicle under control of the driver of the vehicle. At 14 is shown a lever of the second class pivoted at 15, and this lever will be understood as illustrating any suitable hand or foot operated means to set the brake. As shown, this is a foot lever adapted to be thrust forwardly by the driver while he occupies his position on or adjacent the seat 16 of the vehicle. For the purpose of checking or controlling the speed of the vehicle on down grades or the like or for the usual stopping of the vehicle, the lever 14 may be used freely for setting the brake without being affected by the locking devices, if desired. On the other hand, when the driver leaves the vehicle he not only will set the brake but will apply a lock to the brake operating devices which will become effective automatically to make it impossible to release the brake by any unauthorized person. In carrying out these objects I show as a practical embodiment of means a bar 17 having a series of teeth 18 along the same, one end of said bar being pivoted at 19 to the foot lever and the other end of the bar being connected at 20 to a lever 21 secured to a rock shaft 22 journaled at its ends at 23 in a pair of brackets 24 secured to the vehicle body in any convenient place between the foot lever 14 and the brake shoes 13. The bar 17 is provided with an extension rod 25 provided with a turn buckle 26 so as to take up for wear of the brake shoes or any of the joints of the connections.

A plunger 27 is arranged substantially at right angles to the bar 17 and carries at its end adjacent the bar 17 a head 28 having one or more teeth adapted to coöperate with the teeth 18 of the bar. Said plunger 27, however, is normally held out of engagement with the bar 17 by means of a spring 29 surrounding a stem 29$^a$ moving within a keeper 29$^b$, the spring 29 acting between said keeper and a shoulder 29$^c$ secured to the stem. The upper end of the plunger or the end opposite the head 28 is pivoted to a lever 30 of a lock setting or actuating device including a bolt 31 extending upwardly from a casing 32 beneath the seat 16 within easy reach of the driver while on or near the seat. The bolt 31 is held normally elevated by said spring acting through the stem 29$^a$ and lever 30, the lever having pin and slot connection 33 with the bolt 31. The opposite end of the lever 30 is pivoted at 34 to said casing 32. The bolt 31 is provided with a series of teeth 35 coöperating with a locking bolt 36 carried in or through a lock casing 37 secured to the wall of the casing 32 adjacent said bolt 31, and the bolt 36 is connected by a flexible connection 38, shown as a chain, to a shank 39 constituting a part of a key controlled lock mechanism having a face plate 40 at the front of the aforesaid casing 32 and into which the key may be inserted for the purpose of rotating the shank 39. It will be observed also that the casing 32 constitutes a practical inclosure for the operating parts of the mechanism so as to protect them from being injured by the commodities carried by the vehicle and also from being tampered with by unauthorized persons.

With the foregoing description of the mechanism, the operation may be briefly described as follows:—When it is desired to leave the vehicle and prevent its loss while absent, the driver will apply his foot to the lever 14 with sufficient force to set the brake shoes into locking engagement with the wheels 12. When this is accomplished, he will force the bolt 31 downwardly so as to cause the plunger 27 to be depressed under the action of the lever 30, causing the head 28 to come into locking engagement with the teeth 18 of the bar 17. When the plunger 27 is depressed, the bolt 36 of the lock will automatically drop into a space above one of the teeth 35, thereby locking the plunger down in engagement with the bar 17 and preventing the release of the brake. The driver of the vehicle, however, upon applying his individual key to the tumbler mechanism at 40 will rotate the shank 39 and thereby withdraw the bolt 36 out of engagement with the bolt 31. The plunger 27, then, will be free to be lifted bodily out of engagement with the bar 17, setting the bar, the brake shoes, and the connections between them, free, and they in turn will be operated to an inoperative position by means of a spring 41 shown as connected to the vehicle body at one end and to the connecting rod 25 at the other end.

Having thus described my invention, I claim as new and desire to secure by Letters Patent:—

In a vehicle brake mechanism, the combination with a vehicle body and running gear supporting the same, of a brake adapted to act upon the running gear to prevent operation thereof, said brake including a pivoted lever and a toothed bar connected to said lever for longitudinal movement while setting the brake, a plunger movable at an angle toward said bar and adapted to interlock with the teeth thereof, a lever of the second class connected to the upper end of the plunger, a bolt 31 having pin and slot connection to the free end of the lever and movable substantially parallel to the plunger for depressing the latter, said bolt 31 having teeth, a locking bolt movable at right angles to the bolt 31 into engagement with said teeth to lock the bolt and plunger depressed, and key mechanism including a chain attached to the last mentioned bolt for releasing it from the first mentioned bolt, substantially as set forth.

In testimony whereof I have signed my name to this specification in the presence of two subscribing witnesses.

AUGUST HEINRICH MARHENKE.

Witnesses:
GEO. L. BEELER,
PHILIP D. ROLLHAUS.

Copies of this patent may be obtained for five cents each, by addressing the "Commissioner of Patents, Washington, D. C."